United States Patent
Peng et al.

(10) Patent No.: US 8,856,872 B2
(45) Date of Patent: Oct. 7, 2014

(54) COMPUTER FOR DISCONNECTING ITSELF FROM AN EXTERNAL NETWORK BY DISABLING ITS NETWORK CARD AFTER A CONNECTION TIME HAS EXPIRED

(75) Inventors: Zheng-Quan Peng, Shenzhen (CN); Guan Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 860 days.

(21) Appl. No.: 13/076,477

(22) Filed: Mar. 31, 2011

(65) Prior Publication Data

US 2012/0191853 A1   Jul. 26, 2012

(30) Foreign Application Priority Data

Jan. 25, 2011  (CN) .......................... 2011 1 0026765

(51) Int. Cl.
*G06F 1/00* (2006.01)
*G06F 1/32* (2006.01)
*G06F 1/14* (2006.01)
*G06F 1/18* (2006.01)
*G06F 1/26* (2006.01)

(52) U.S. Cl.
CPC ................ *G06F 1/14* (2013.01); *G06F 1/3209* (2013.01); *G06F 1/181* (2013.01); *G06F 1/26* (2013.01)
USPC ............................... 726/2; 713/300; 713/320

(58) Field of Classification Search
CPC ... G06F 2221/2137; G06F 1/14; G06F 1/181; G06F 1/26; G06F 1/3209
USPC .................................................. 713/300, 320
See application file for complete search history.

(56) References Cited

U.S. PATENT DOCUMENTS

| | | | |
|---|---|---|---|
| 6,599,139 B1 * | 7/2003 | Hunter | 439/133 |
| 6,678,824 B1 * | 1/2004 | Cannon et al. | 726/22 |
| 7,409,482 B2 * | 8/2008 | Olsen et al. | 710/107 |
| 7,619,504 B2 * | 11/2009 | Cohen | 340/309.16 |
| 8,010,037 B2 * | 8/2011 | Bannwolf et al. | 434/350 |
| 2006/0155877 A1 * | 7/2006 | Hashimoto et al. | 709/249 |
| 2007/0074284 A1 * | 3/2007 | Woog | 726/16 |
| 2010/0299720 A1 * | 11/2010 | John et al. | 726/3 |

* cited by examiner

*Primary Examiner* — Mark Connolly
(74) *Attorney, Agent, or Firm* — Novak Druce Connolly Bove + Quigg LLP

(57) ABSTRACT

A computer includes an enclosure, a network card connected to an external network, a time limit control device, a power module, and a switch. The time limit control device is used to set a connection time of the computer with the external network, and control a network switch module to enable the network card to connect the computer to the external network according the set connection time. The time limit control device is used to count down the connection time, and control a display module to display a remaining connection time. When a countdown of the connection time is zero, the time limit control device controls the network switch module to disable the network card and thereby disconnecting the computer from the external network.

6 Claims, 2 Drawing Sheets

COMPUTER FOR DISCONNECTING ITSELF FROM AN EXTERNAL NETWORK BY DISABLING ITS NETWORK CARD AFTER A CONNECTION TIME HAS EXPIRED

BACKGROUND

1. Technical Field

The present disclosure relates to computers, and particularly, to a computer having a time limit control device to control access of the computer to a network.

2. Description of Related Art

With the development of computers and network, kids have become addicted to online games, which is unhealthy. Limiting the time of a network connection becomes a common method to prevent overuse of online games. Commonly, a method of limiting the time of the network connection is by adjusting settings of a router, which is complicated to do.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
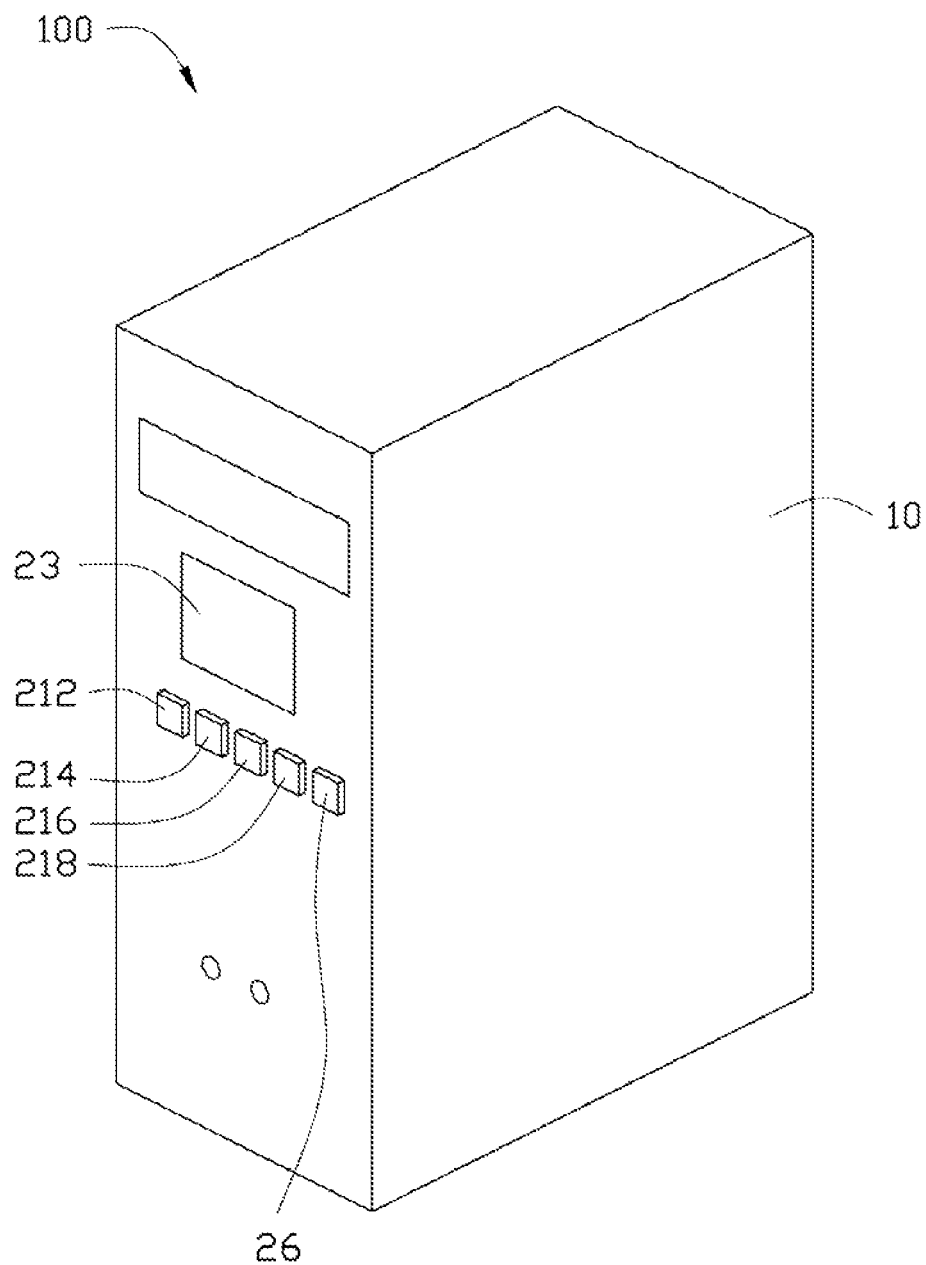
FIG. 1 is a schematic view of an exemplary embodiment of a computer, the computer includes a time limit control device and a network card.
Figure 2:
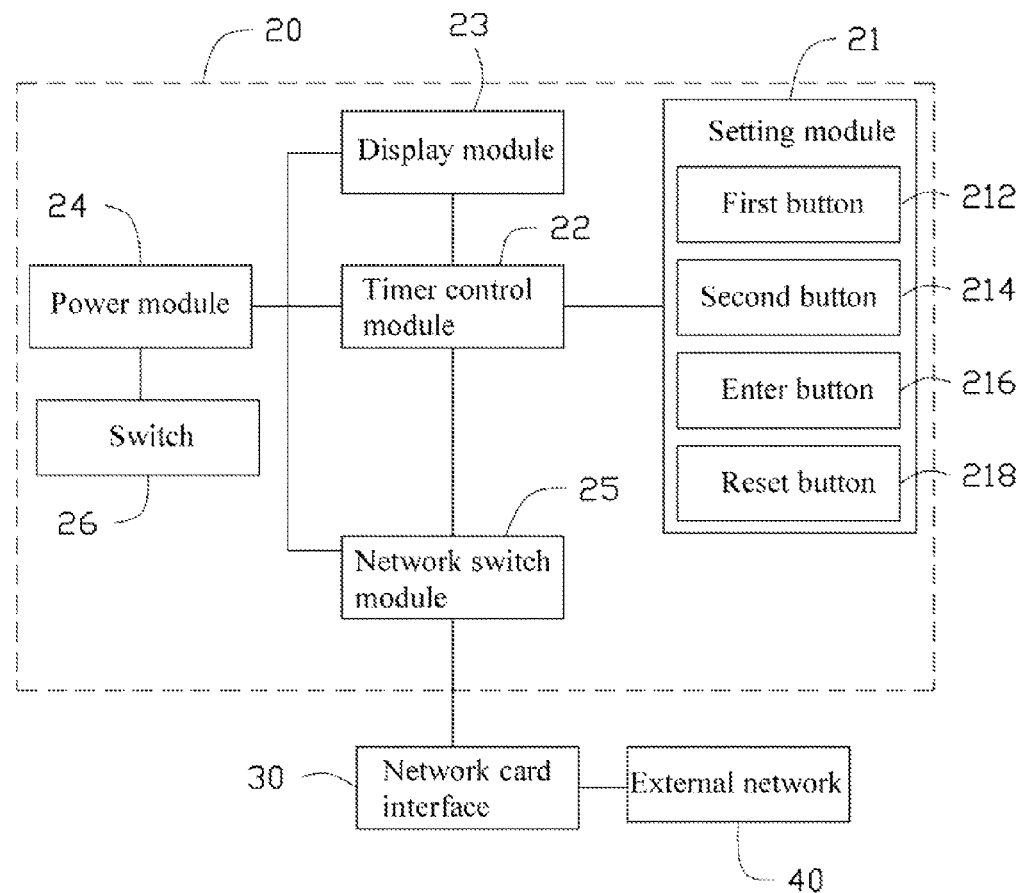
FIG. 2 is a block diagram of the time limit control device and the network card of FIG. 1.

Referring to FIGS. 1 and 2, an exemplary embodiment of a computer 100 includes an enclosure 10, and a time limit control device 20 and a network card 30 mounted in the enclosure 10. The network card 30 is connected between the time limit control device 20 and an external network 40.

The time limit control device 20 includes a setting module 21, a timer control module 22, a display module 23, a power module 24, a network switch module 25, and a switch 26 connected to the power module 24. The timer control module 22, the power module 24, and the network switch module 25 are enclosed in the enclosure 10. The setting module 21 includes a first button 212, a second button 214, an enter button 216, and a reset button 218. The first button 212, the second button 214, the enter button 216, and the reset button 218 are connected to the timer control module 22. The timer control module 22 is further connected to the display module 23 and the network switch module 25. The first button 212, the second button 214, the enter button 216, the reset button 218, the display module 23, and the switch 26 are exposed through the enclosure 10.

The power module 24 is connected to the timer control module 22, the display module 23, and the network switch module 25. The power module 24 is used to power the timer control module 22, the display module 23, and the network switch module 25.

The network switch module 25 is connected to the network card 30 to enable or disable the network card 30.

A default time, such as 30 minutes, is recorded in the timer control module 22. When the computer 100 is controlled to go online, the network card 30 will be connected to the external network 40 for the default time.

To adjust the default time, the first button 212 is used to increase the default time, such as by 5 minutes, per each press of the first button 212. The second button 214 is used to decrease the default time, such as by 5 minutes, per each press of the second button 214. And the enter button 216 is used to apply any adjustment according to the pressing of the first or second buttons 212, 214 in the timer control module 22.

The reset button 218 is used to disconnect the external network 40 from the network card interface 30, and reset the timer control module 22 to the default time.

The display module 23 is used to display the default time or adjusted time depending on which applies, and a remaining connection time, and current connection status.

In the embodiment, the default time can be incrementally adjusted for each instance of connecting to the network 40, the value of increment can be determined by a user with administrative access, such as 10 minutes instead of 5 minutes, and the default time can be changed as well such as to 1 hour or 2 hours.

To use the time limit control device 20, the switch 26 is pressed, and the time limit control device 20 is powered on. That is, the power module 24 supplies a voltage to the timer control module 22, the display module 23, and the network switch module 25. The timer control module 22 controls the display module 23 to display the default time, which denotes the network switch module 25 can enable the network card 30 to connect computer 100 to the external network 40 for the default time. The connection time of the computer 100 with the external network 40 can be adjusted. If the connection time needs to be increased, the first button 212 needs to be pressed. If the connection time needs to be decreased, the second button 214 needs to be pressed. After the connection time is adjusted, the enter button 216 is pressed to apply the adjustment in the timer control module 22. The timer control module 22 records the adjusted connection time, controls the network switch module 25 to enable the network card 30 to connect the computer 100 to the external network 40, counts down the connection time, and at that time, controls the display module 23 to display the connection time. The timer control module 22 also controls the display module 23 to display the remaining connection time, and the network state of the computer 100. When the countdown of the timer control module 22 is zero, the timer control module 22 controls the network switch module 25 to disable the network card 30 to disconnect the computer 100 from the external network 40 to realize network time limit control for the computer 100. The display module 23 displays that the computer 100 is disconnected from the external network 40.

When the connection time is adjusted, if the reset button 218 is pressed, the timer control module 22 rewrites the connection time to be the default time. When the computer 100 is connected to the external network 40, and the timer control module 22 is counting down, if the reset button 218 is pressed, the timer control module 22 controls the network switch module 25 to disable the network card 30 to disconnect the computer 100 from the external network 40, and rewrites the recorded connection time to be the default time.

In other embodiments, the reset button 218 can be omitted. The timer control module 22 does not record the default time. The connection time is adjusted by pressing the first or second button 212 or 214 after powering the time limit control device

20. When the default time is recorded in the timer control module 22, if the reset button 218 is pressed, the timer control module 22 controls the network switch module 22 to disable the network card 30 to disconnect the computer 100 from the external network 40 directly.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A computer comprising:
   an enclosure;
   a network card mounted in the enclosure, and connected to an external network;
   a time limit control device comprising:
      a network switch module connected to the network card to enable or disable the network card to connect the computer to the external network or disconnect the computer from the external network;
      a setting module mounted on the enclosure to set a connection time of the computer with the external network;
      a timer control module mounted in the enclosure to control the network switch module to enable the network card to connect the computer to the external network according to the set connection time, wherein after the connection time, the timer control module controls the network switch module to disable the network card to disconnect the computer from the external network;
   a power module to power a display module, the network switch module, and the timer control module; and
   a switch to turn on the power module.

2. The computer of claim 1, wherein the time limit control device further comprises a display module to display the set connection time.

3. The computer of claim 2, wherein the timer control module further counts down the connection time, and the display module further displays a remaining connection time, wherein when the remaining connection time is zero, the timer control module controls the network switch module to disable the network card to disconnect the computer from the external network.

4. The computer of claim 1, wherein the setting module comprises a first button, a second button, and an enter button, the first button, the second button, and the enter button are connected to the timer control module, the first button is pressed to increase the connection time, the second button is pressed to decrease the connection time, the enter button is pressed to apply any adjustment according to the pressing of the first and second buttons in the timer control module.

5. The computer of claim 4, wherein the setting module further comprises a reset button connected to the timer control module, when the computer is connected to the external network, if the reset button is pressed, the timer control module controls the network switch module to disable the network card to disconnect the computer from the external network.

6. The computer of claim 5, wherein a default time is recorded in the timer control module, when the power module is turned on by the switch, the timer control module controls the display module to display the default time, the first button is used to increase the default time, per each press of the first button, the second button is used to decrease the default time per each press of the second button, the reset button is pressed, the timer control module resets the connection time to the default time.

* * * * *